(12) United States Patent
Ortet et al.

(10) Patent No.: US 11,456,661 B2
(45) Date of Patent: Sep. 27, 2022

(54) STARTING OF A SWITCHED-MODE POWER SUPPLY

(71) Applicant: STMicroelectronics (Rousset) SAS, Rousset (FR)

(72) Inventors: Sebastien Ortet, Beaurecueil (FR); Cedric Thomas, Aix-en-Provence (FR)

(73) Assignee: STMicroelectronics (Rousset) SAS, Rousset (FR)

( * ) Notice: Subject to any disclaimer, the term of this patent is extended or adjusted under 35 U.S.C. 154(b) by 144 days.

(21) Appl. No.: 16/930,535

(22) Filed: Jul. 16, 2020

(65) Prior Publication Data

US 2021/0028687 A1 Jan. 28, 2021

(30) Foreign Application Priority Data

Jul. 22, 2019 (FR) ...................................... 1908288

(51) Int. Cl.
*H02M 1/36* (2007.01)
*H02M 3/158* (2006.01)

(52) U.S. Cl.
CPC ............. *H02M 1/36* (2013.01); *H02M 3/158* (2013.01)

(58) Field of Classification Search
CPC .... H02M 3/158; H02M 3/1582; H02M 3/157; H02M 3/156; H02M 3/137; H02M 3/139; H02M 1/36
See application file for complete search history.

(56) References Cited

U.S. PATENT DOCUMENTS

| 2005/0088212 | A1  | 4/2005 | Leith et al. |
| 2014/0145698 | A1* | 5/2014 | Saito ........................ H02M 1/32 323/285 |
| 2020/0228010 | A1* | 7/2020 | Wiktor .................. H02M 3/156 |

FOREIGN PATENT DOCUMENTS

| EP | 2437385 A2 | 4/2012 |
| JP | 2008178257 A | 7/2008 |
| JP | 20160101093 A | 1/2016 |

OTHER PUBLICATIONS

First Office Action from co-pending EP Appl. No. 20186477.4 dated Jun. 25, 2021 (4 pages).
INPI Search Report and Written Opinion for FR 1908288 dated Mar. 31, 2020 (9 pages).
On Semiconductor: "Buck converter with bypass mode for RF power amplifiers NCP6361", Apr. 30, 2014 (20 pages).

* cited by examiner

*Primary Examiner* — Nguyen Tran
(74) *Attorney, Agent, or Firm* — Crowe & Dunlevy

(57) ABSTRACT

The process for starting a power supply circuit which includes a switched-mode power supply is performed using: a first phase during which, if an output voltage of the switched-mode power supply is lower than a first voltage, the switched-mode power supply operates in pulse width modulation mode to increase its output voltage up to said first voltage; and when the output voltage has reached the first voltage, a second phase during which the switched-mode power supply operates in a bypass mode.

9 Claims, 4 Drawing Sheets

STARTING OF A SWITCHED-MODE POWER SUPPLY

PRIORITY CLAIM

This application claims the priority benefit of French Application for Patent No. 1908288, filed on Jul. 22, 2019, the content of which is hereby incorporated by reference in its entirety to the maximum extent allowable by law.

TECHNICAL FIELD

The present disclosure generally concerns electronic circuits and devices and, more particularly, the power supply thereof. The present disclosure particularly concerns a power supply circuit comprising at least one switched-mode power supply (SMPS).

BACKGROUND

There exist several types of electric power supply circuits enabling to deliver a current/voltage pair to an electronic circuit, or device, or system, or more generally to a load. Linear power supplies and switched-mode power supplies are examples of power supply circuits.

The different types of power supply circuit each have specific features, and it may be useful to combine a plurality thereof. The combination of a switched-mode power supply and a voltage regulator is a usual combination in a power supply circuit.

A switched-mode power supply is a power supply circuit configured to delivering a DC voltage from an input voltage. Although switched-mode power supplies are generally DC/DC converters, receiving as an input a DC voltage, certain switched-mode power supplies may comprise a rectifying stage enabling them to receive an AC voltage, for example, the mains, as an input.

It would be desirable to be able to at least partly improve certain aspects of known power supply circuits comprising a switched-mode power supply.

There is a need in the art for higher-performance power supply circuits comprising a switched-mode power supply.

There is more particularly a need in the art for power supply circuits having a faster startup phase.

There is also a need in the art for power supply circuits having a startup phase consuming less power.

SUMMARY

An embodiment overcomes all or part of the disadvantages of known power supply circuits comprising a switched-mode power supply.

An embodiment provides a method of starting a power supply circuit comprising a switched-mode power supply, comprising: a first phase during which, if an output voltage of the switched-mode power supply is lower than a first voltage, the switched-mode power supply operates in pulse-width modulation to increase its output voltage up to said first voltage; and a second bypass phase when the output voltage has reached the first voltage.

According to an embodiment, the first voltage is the voltage delivered by the switched-mode power supply during a bypass mode.

According to an embodiment, the first voltage is a DC voltage injected at the input of the switched-mode power supply.

According to an embodiment, the first voltage is a DC voltage injected at the input of the power supply circuit.

According to an embodiment, said output voltage is compared with a second voltage, lower than the first voltage, during a third phase preceding said first phase.

Another embodiment provides a circuit for starting a switched-mode power supply configured to implementing a previously-described method.

According to an embodiment, the circuit comprises a comparator circuit configured to compare the output voltage with a third voltage.

According to an embodiment, the third voltage is equal, during the first phase, to the first voltage.

According to an embodiment, the third voltage is equal, during the third phase, to the second voltage.

According to an embodiment, the circuit further comprises a state machine.

According to an embodiment, the comparator circuit is controlled by the state machine.

BRIEF DESCRIPTION OF THE DRAWINGS

The foregoing and other features and advantages will be discussed in detail in the following non-limiting description of specific embodiments in connection with the accompanying drawings, wherein.

DETAILED DESCRIPTION

Figure 1:
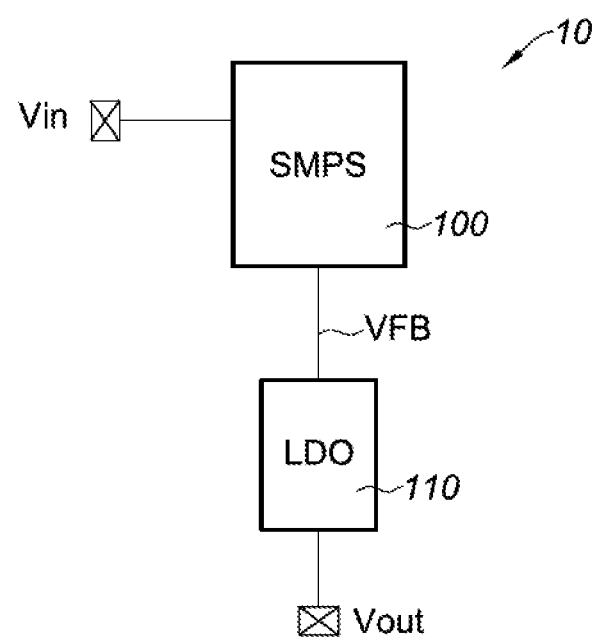
FIG. 1 schematically shows in the form of blocks a power supply circuit.

The same elements have been designated with the same reference numerals in the different drawings. In particular, the structural and/or functional elements common to the different embodiments may be designated with the same reference numerals and may have identical structural, dimensional, and material properties.

For clarity, only those steps and elements which are useful to the understanding of the described embodiments have been shown and are detailed. In particular, the general operation of a switched-power supply will not be detailed. The described embodiments and implementation modes are compatible with usual switched-mode power supplies.

Throughout the present disclosure, the term "connected" is used to designate a direct electrical connection between circuit elements with no intermediate elements other than conductors, whereas the term "coupled" is used to designate an electrical connection between circuit elements that may be direct, or may be via one or more other elements.

In the following description, when reference is made to terms qualifying absolute positions, such as terms "front", "back", "top", "bottom", "left", "right", etc., or relative positions, such as terms "above", "under", "upper", "lower", etc., or to terms qualifying directions, such as terms "horizontal", "vertical", etc., unless otherwise specified, it is referred to the orientation of the drawings.

The terms "about", "approximately", "substantially", and "in the order of" are used herein to designate a tolerance of plus or minus 10%, preferably of plus or minus 5%, of the value in question.

The signals mentioned in the disclosure are analog signal comprising a high state and a low state respectively corresponding to logic data "1" and "0". The high state represents, unless otherwise mentioned, a voltage level equal to a power supply voltage. The low state represents, unless otherwise mentioned, a voltage level equal to a reference voltage, for example, the ground.

FIG. 1 schematically shows in the form of blocks a power supply circuit 10.

Circuit 10 comprises, in series, a switched-mode power supply (SMPS) 100 and a voltage regulator circuit 110 (for example, a low-drop out—LDO—regulator circuit). Circuit 10 receives, as an input, an input power supply voltage Vin and control signals (not shown in FIG. 1) and outputs an output power supply voltage Vout and, for example, other control signals (not shown in FIG. 1). Voltage Vin is more particularly received by switched-mode power supply 100 and voltage Vout is more particularly delivered by voltage regulator 110. Switched-mode power supply 100 delivers as an output a DC power supply voltage VFB to the input of the voltage regulator circuit 110.

A circuit of the type of circuit 10 may have a plurality of operating modes.

A conventional operating mode of circuit 10 is the following. The switched-mode power supply operates in pulse width modulation and delivers a voltage VFB different from the voltage Vin that it receives as an input. Voltage VFB is then smoothed by the regulator circuit 110.

Another operating mode of circuit 10 is a so-called bypass mode of switched-mode power supply 100, where switched-mode power supply 100 is bypassed. In other words, the switched-mode power supply delivers an output voltage VFB equal to input voltage Vin to the input of the regulator circuit 110. For this purpose, it does not operate in pulse width modulation but it is forced to output a voltage equal to input voltage Vin. Thus, in this operating mode, voltage VFB is equal to input voltage Vin. This operating mode will be further detailed in FIG. 2.

Figure 2:
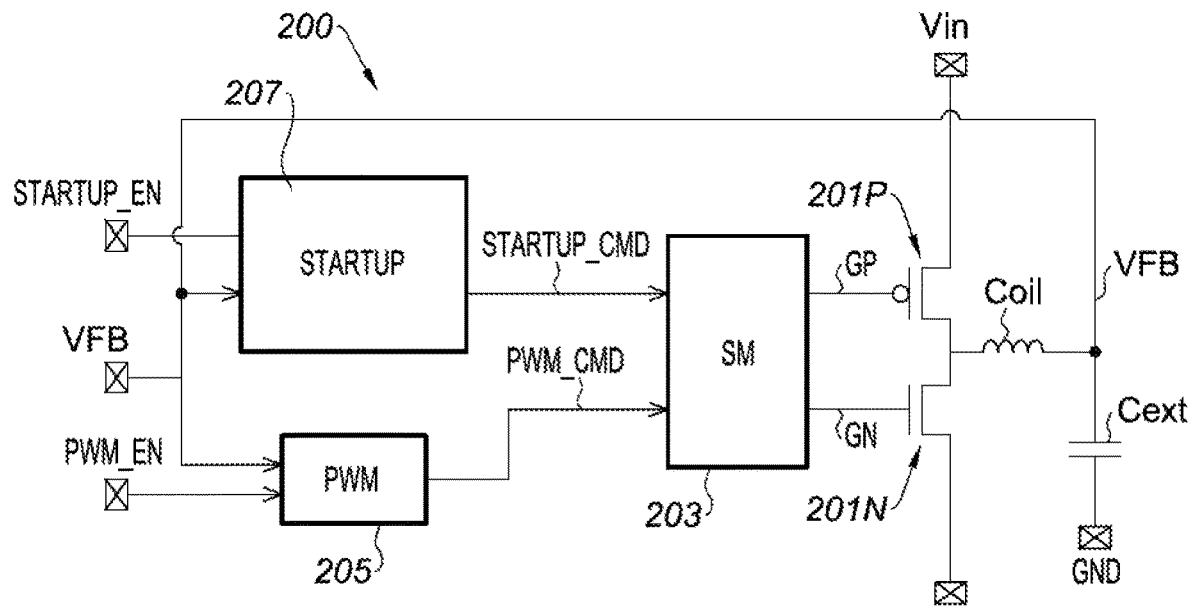
FIG. 2 schematically shows in the form of blocks an embodiment of a switched-mode power supply.

FIG. 2 schematically shows in the form of blocks a structure of an embodiment of a switched-mode power supply 200 configured to being used in a power supply circuit of the type of the circuit 10 shown in FIG. 1.

Switched-mode power supply 200 comprises an N-channel MOS transistor 201N and a P-channel MOS transistor 201P. Transistors 201P and 201N are series-connected. More particularly, the drain of transistor 201N is coupled, preferably connected, to the drain of transistor 201P. The source of transistor 201P is coupled, preferably connected, to a terminal receiving input voltage Vin. The source of transistor 201N is coupled, preferably connected, to a terminal receiving a low power supply voltage VSS_POWER. Low power supply voltage VSS_POWER is, for example, the ground.

Switched-mode power supply 200 further comprises an inductance Coil and a capacitor Cext. A first terminal of inductance Coil is coupled, preferably connected, to the drains of transistors 201N and 201P. A second terminal of inductance Coil is coupled, preferably connected, to a first terminal of capacitor Cext. A second terminal of capacitor Cext is coupled, preferably connected, to a terminal receiving a reference voltage GND, for example, the ground. Reference voltage GND is, for example, equal to low power supply voltage VSS_POWER. The second terminal of inductance Coil delivers output voltage VFB of switched-mode power supply 200.

Switched-mode power supply 200 further comprises a state machine 203 (SM) delivering signals GP and GN enabling to respectively control the gates of transistors 201P and 201N. State machine 203 receives, as an input, control signals STARTUP_CMD and PWM_CMD detailed hereafter.

Switched-mode power supply 200 further comprises a pulse width modulation circuit 205 (PWM) configured to implement an operation of switched-mode power supply 200 in pulse width modulation mode. Circuit 205 receives as an input, among others, output voltage VFB of switched-mode power supply 200 and control signals PWM_EN. Circuit 205 delivers as an output at least control signals PWM_CMD to state machine 203. The operation of a switched-mode power supply in pulse width modulation is usual and is not described herein.

Switched-mode power supply 200 further comprises a startup circuit 207 (STARTUP). Circuit 207 receives as an input, among others, output voltage VFB, and control signals STARTUP_EN. Circuit 207 delivers at its output control signals STARTUP_CMD to state machine 203. Circuit 207 is shown in further detail in FIG. 3.

Figure 3:
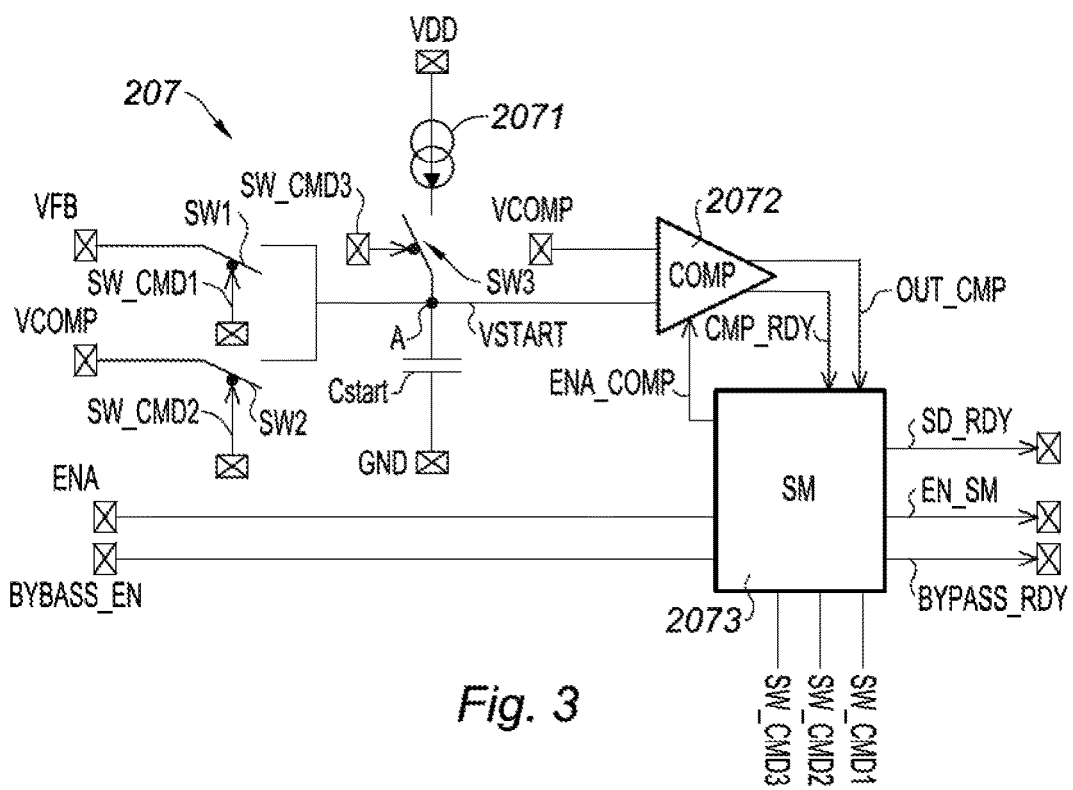
FIG. 3 schematically shows in the form of blocks an embodiment of a circuit for starting the switched-mode power supply of FIG. 2.

FIG. 3 schematically shows in the form of blocks a structure of startup circuit 207 of the switched-mode power supply 200 shown in FIG. 2.

Circuit 207 receives as an input the output voltage VFB of switched-mode power supply 200, a comparison voltage VCOMP, a power supply voltage VDD, and control signals STARTUP_EN. Signals STARTUP_EN comprise a signal ENA for enabling startup circuit 207, and a signal BYPASS-EN for enabling the bypass mode of switched-mode power supply 200.

Circuit 207 outputs signals STARTUP_CMD which comprise a state signal SD_RDY, a signal EN_SM for enabling state machine 203, and a state signal BYPASS_RDY of the bypass mode of switched-mode power supply 200.

Circuit 207 comprises two switches SW1 and SW2. Switch SW1 receives voltage VFB on a first terminal and has a second terminal coupled, preferably connected, to a node A. Switch SW2 receives voltage VCOMP on a first terminal and has a second terminal coupled, preferably connected, to node A. Switches SW1 and SW2 are controlled by signals SW_CMD1 and SW_CMD2.

Circuit 207 further comprises a switch SW3 and a current source 2071. A first terminal of switch SW3 is coupled, preferably connected, to node A, and a second terminal of switch SW3 is coupled, preferably connected, to a first terminal of current source 2071. A second terminal of current source 2071 receives power supply voltage VDD. Switch SW3 is controlled by a signal SW_CMD3.

Circuit 207 further comprises a capacitor Cstart. An electrode of capacitor Cstart is coupled, preferably connected, to node A, and a second electrode of capacitor Cstart is coupled, preferably connected, to a terminal receiving reference voltage GND.

Circuit 207 further comprises a comparator circuit 2072 (COMP). Circuit 2072 is configured to comparing with voltage VCOMP the voltage of node A, noted VSTART. Circuit 2072 is controlled by a signal ENA_COMP, and outputs a state signal CMP_RDY and an output signal OUT_CMP.

Circuit 207 further comprises a state machine 2073 (SM) receiving as inputs the following signals: enable signal ENA; signal BYPASS_EN for enabling the bypass mode of the switched-mode power supply; signal CMP_RDY; and signal OUT_CMP.

State machine 2073 outputs the following signals: signals SW_CMD1, SW_CMD2, and SW_CMD3 for controlling switches SW1, SW2, and SW3; signal ENA_COMP for enabling comparator circuit 2072; state signal SD_RDY; enable signal EN_SM; and state signal BYPASS_RDY.

Circuit 207 enables, among others, to start switched-mode power supply 200 directly in a bypass mode. The operation and an implementation mode of circuit 207 are detailed in FIG. 4.

Figure 4:
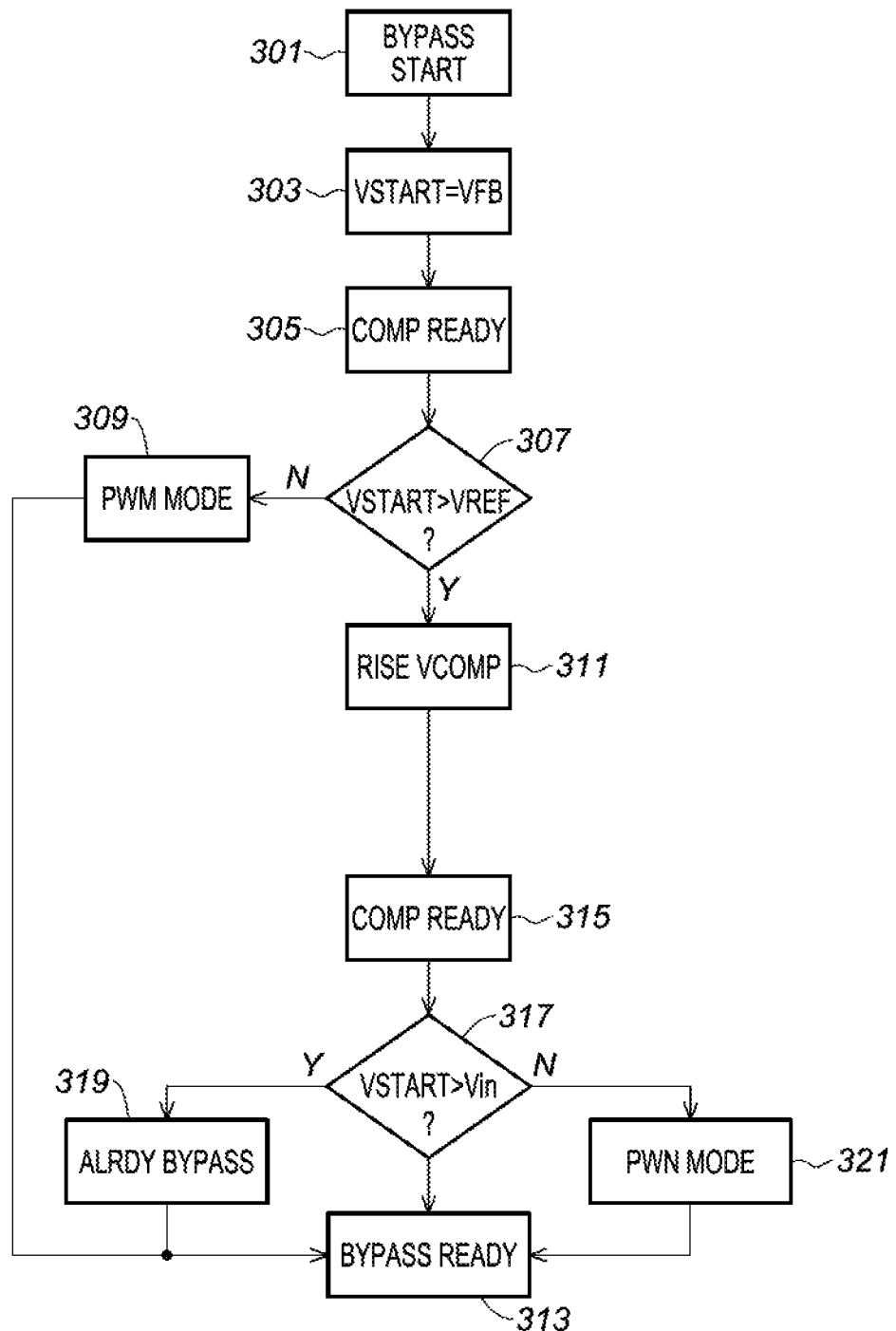
FIG. 4 shows a flowchart illustrating an embodiment of a power supply circuit startup method.

FIG. 4 is a flowchart illustrating an implementation mode of the startup circuit 207 shown in FIG. 3, in the context of a starting of switched-mode power supply 200 in a bypass mode. The switched-mode power supply is considered to be in a bypass mode when its output voltage VFB is equal to input voltage Vin and when state signal BYPASS_RDY is at a high level.

At a step 301 (BYPASS START), the starting of switched-mode power supply 200 in a bypass mode is requested. For this purpose, enable signal ENA switches to a high level, indicating the starting of power supply 200, and signal BYPASS_EN also switches to a high level, indicating the triggering of a bypass mode of switched-mode power supply 200.

At a step 303 (VSTART=VFB), state machine 2073 controls switch SW1 to the on state and switches SW2 and SW3 to the off state. Voltage VSTART is then equal to voltage VFB and capacitor Cstart is charged by voltage VFB. Comparator circuit 2072 is started.

At a step 305 (COMP READY), signal COMP_RDY switches to a high level, the comparator is ready to be used. State machine 2073 controls the three switches SW1, SW2, and SW3 to the off state. Comparison voltage VCOMP is, first, equal to a first low threshold voltage VREF. Capacitor Cstart then delivers voltage VFB.

At a step 307 (VSTART>VREF?), the comparator circuit compares voltage VSTART with voltage VCOMP, still equal to voltage VREF. The result of this comparison is coded in the output signal of comparator circuit OUT_COMP. More particularly, if voltage VSTART is lower than voltage VCOMP (output N) then output signal OUT_COMP is in a low state, and the next step is a step 309 (PWM MODE). If voltage VSTART is higher than voltage VCOMP (output Y), then output signal OUT_COMP is in a high state, and the next step is a step 311 (RISE VCOMP).

At step 309, the switched-mode power supply is started in a pulse width modulation mode to increase its output voltage VFB until voltage VFB is equal to input voltage Vin. The next step is then a step 313 (BYPASS READY) where output voltage VFB of switched-mode power supply 200 is equal to input voltage Vin, and where signal BYPASS_RDY switches to a high level.

At step 311, enable signal SD_RDY is switched to a high state. Signal VCOMP is increased to the value of input voltage Vin. Comparator circuit 2072 is stopped, signal COMP_RDY switches to a low state, and the comparator circuit is restarted.

At a step 315 (COMP READY), the comparator is ready to be used, signal COMP_RDY switches to a high level. State machine 2073 controls the three switches SW1, SW2, and SW3 to the off state. Comparison voltage VCOMP is equal to voltage Vin.

At a step 317 (VSTART>Vin?), the comparator circuit compares voltage VSTART, still equal to output voltage VFB, with voltage VCOMP, then equal to voltage Vin. The result of this comparison is coded in the output signal of comparator circuit OUT_COMP. More particularly, if voltage VSTART is greater than voltage VCOMP (output Y) then output signal OUT_COMP is in a low state, and the next step is a step 319 (ALRDY BYPASS). If voltage VSTART is lower than voltage VCOMP (output N), then output signal OUT_COMP is in a high state, and the next step is a step 321 (PWM MODE).

At step 319, output voltage VFB of the switched-mode power supply is already at a level greater than or equal to that of input voltage Vin. State machine 2073 controls switches SW1 and SW3 to the off state, and switch SW2 to the on state. By turning on switch SW2, capacitor Cstart is used as a coupling capacitor between voltage VDD and reference voltage GND. Signal BYPASS_RDY switches to a high state. The next step then is step 313.

At step 321, output voltage VFB is not high enough yet for switched-mode power supply 200 to be in a bypass mode. Switched-mode power supply 200 is then started in a pulse width modulation mode to increase its output voltage VFB until voltage VFB is equal to input voltage Vin. Voltage VFB follows a slow ramp to avoid damaging transistor 201P of switched-mode power supply 200, by sending thereto too high a voltage, too rapidly.

State machine 2073 then controls switches SW1 and SW2 to the off state and switch SW3 to the on state. By the turning on of switch SW3, capacitor Cstart charges. Further, once voltage VFB is at voltage Vin, capacitor Cstart is charged and switch SW3 is then turned back off. Signal BYPASS_RDY switches to a high state. The next step then is step 313.

At step 313, switched-mode power supply 200 has an output voltage VFB which is greater than or equal to input voltage Vin. During its operation, output voltage VFB will settle at input voltage Vin, and the switched-mode power supply will then be in a bypass mode.

Figure 5:
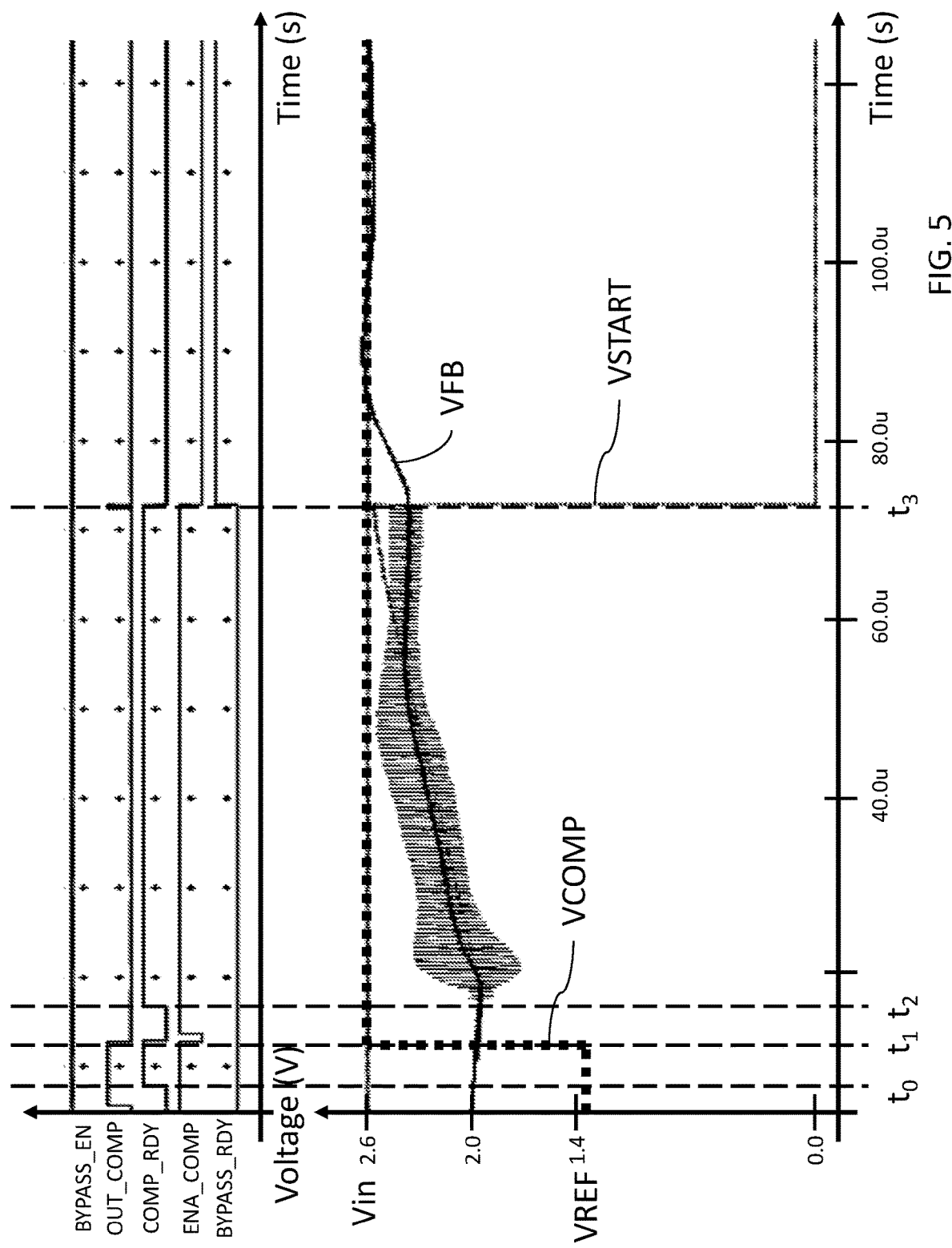
FIG. 5 shows timing diagrams of signals and curves of voltages of the startup circuit of FIG. 3.

FIG. 5 is a graph showing timing diagrams of control signals and curves of voltages of switched-mode power supply 200. More particularly, the shown timing diagrams and curves illustrate the startup method shown in FIG. 4 of the switched-mode power supply 200 shown in FIG. 2, in the case where output voltage VFB of the switched-mode power supply is higher than the first threshold voltage VREF and is lower than input voltage Vin.

The graph of FIG. 5 more particularly shows: a timing diagram of bypass mode enable signal BYPASS_EN; a timing diagram of output voltage OUT_COMP of comparator circuit 2072; a timing diagram of state signal COMP_RDY of comparator circuit 2072; a timing diagram of signal ENA_COMP for enabling comparator circuit 2072; a timing diagram of the state signal BYPASS_RDY of the bypass mode; a curve of comparison voltage VCOMP; a curve of output voltage VFB of switched-mode power supply 200; and a curve of voltage VSTART of node A of the startup circuit 207 of switched-mode power supply 200.

Before an initial time t0, comparator circuit 2072 is enabled, signal ENA_COMP is in a high state. Comparator circuit 2072 is, however, not ready yet to compare the signals that it receives at its input, whereby signal COMP_RDY is in a low state. Output signal OUT_COMP is arbitrarily in a low state or in a high state. Switched-mode power supply 200 is not in a bypass mode, whereby signal BYPASS_RDY is in a low state, but is not in a pulse width modulation mode either. The enabling of the bypass mode is however requested and signal BYPASS_EN is in a high state. Output voltage VFB of switched-mode power supply 200 is, in the case illustrated herein, at a voltage level for example equal to 2 V. Comparison voltage VCOMP is equal to the first threshold voltage which is, in the case illustrated in FIG. 5, lower than voltage VFB, for example, equal to 1.2 V. Voltage VSTART is equal to output voltage VFB.

At an initial time t0, comparator circuit 2072 is ready, and compares signal VFB with comparison signal VCOMP (steps 305 and 307 of FIG. 4), signal COMP_RDY switches to a high state. As previously mentioned, voltage VFB is greater than comparison voltage VCOMP, and thus the output signal of comparator 2072 is in a high state.

At a time t1, comparator circuit 2072 is reset, signal ENA_COMP is successively switched to a low state and then to a high state. The comparator circuit is then no longer ready to perform a comparison, signal COMP_RDY switches to a low state. The output signal OUT_COMP of comparator circuit 2072 switches to a low state. The level of comparison voltage VCOMP is increased until it reaches the level of input voltage Vin of switched-mode power supply 200 (step 311 of FIG. 4), for example, equal to 2.6 V in FIG. 5.

At a time t2, comparator circuit 2072 is ready to be used, signal COMP_RDY switches to a high state. As previously mentioned, voltage VFB is lower than voltage Vin, output signal OUT_COMP is thus in a low state.

Switched-mode power supply 200 then enters a pulse with modulation mode and progressively increases output voltage VFB. Voltage VSTART then also increases according to a ramp.

At a time t3, voltage VSTART reaches voltage Vin (step 317 of FIG. 4), output signal OUT_COMP of comparator circuit 2072 switches to a high state. State machine 2073 deactivates comparator circuit 2072, whereby signals ENA_COMP and COMP_RDY both switch to a low state.

Switched-mode power supply 200 then is in a bypass mode, signal BYPASS_RDY switches to a high state. Voltage VSTART of the pulse width modulation mode decreases down to a low level, for example, the ground.

An advantage of such a startup method is that it is faster and less power-consuming than a conventional bypass mode startup method. Indeed, since the output voltage level of a switched-mode power supply is not known at any time, a startup mode might be to wait until the output voltage of the switched-mode power supply reaches a low threshold voltage to then increase it back up to the desired voltage. Such a startup mode would then be slower and more power-consuming.

Various embodiments and variations have been described. It will be understood by those skilled in the art that certain features of these various embodiments and variations may be combined, and other variations will occur to those skilled in the art. In particular, the input voltage of the switched-mode power supply could be an AC voltage, but in this case, the switched-mode power supply would comprise a rectifying stage to convert the AC input voltage into a DC input voltage. In this case, the switched-mode power supply is in a bypass mode once its output voltage is equal to the DC input voltage.

Finally, the practical implementation of the described embodiments and variations is within the abilities of those skilled in the art based on the functional indications given hereabove.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

The invention claimed is:

1. A method of starting a power supply circuit that includes a switched-mode power supply, comprising:
    operating the power supply circuit in a first phase wherein bypass of the switched-mode power supply to generate an output voltage from an input voltage is requested;
    setting a comparison voltage in the first phase to a first level that is less than the input voltage;
    generating a start voltage that is equal to the output voltage;
    then operating the power supply circuit in a second phase wherein the switched-mode power supply is controlled using pulse width modulation to cause an increase in the output voltage;
    increasing the start voltage in accordance with a ramp while in the second phase;
    comparing the ramping start voltage to the comparison voltage in the second phase; and
    when the ramping start voltage reaches the comparison voltage, then operating the power supply circuit in a third phase wherein the switched-mode power supply is bypassed to generate the output voltage from the input voltage.

2. The method of claim 1, further comprising, when operating the power supply circuit in the second phase, switching the comparison voltage to a second level that is equal to the input voltage.

3. A power supply circuit, comprising:
    a switched-mode power supply receiving an input voltage and generating an output voltage; and
    a circuit including a comparator circuit having an input receiving the comparison voltage, said circuit configured to start the power supply circuit by:
        operating in a first phase wherein bypass of the switched-mode power supply to generate the output voltage from the input voltage is requested;
        generating a start voltage that is equal to the output voltage;
        setting the comparison voltage in the first phase to a first level that is less than the input voltage;
        then operating in a second phase wherein the switched-mode power supply is controlled using pulse width modulation to cause an increase in the output voltage;
        increasing the start voltage in accordance with a ramp during in the second phase;
        comparing the ramping start voltage to the comparison voltage during the second phase; and
        when the ramping start voltage reaches the comparison voltage, then operating in a third phase wherein the switched-mode power supply is bypassed to generate the output voltage from the input voltage.

4. The power supply circuit of claim 3, wherein the circuit includes a state machine.

5. The power supply circuit of claim 3, wherein the comparison voltage during the second phase is at a second level that is equal to the input voltage.

6. The power supply circuit of claim 5, wherein the circuit includes a state machine and wherein the comparator circuit is controlled by the state machine.

7. A method of starting a power supply circuit that includes a switched-mode power supply, comprising:
- operating the power supply circuit in a first phase including:
  - generating a start voltage that is equal to an output voltage of the switched-mode power supply; and
  - first comparing the start voltage to a comparison voltage set at a first level that is less than an input voltage of the switched-mode power supply;
- when the start voltage is less than the comparison voltage in the first comparing, then:
  - operating the power supply circuit in a second phase wherein the switched-mode power supply is controlled using pulse width modulation to cause an increase in the output voltage;
- conversely, when the start voltage is more than the comparison voltage in the first comparing, then:
  - increasing the comparison voltage to a second level that is greater than the first level; and
  - second comparing the start voltage to the comparison voltage set at the second level;
- when the start voltage is more than the comparison voltage in the second comparing, then:
  - operating the power supply circuit in a third phase wherein the switched-mode power supply is bypassed to generate the output voltage from the input voltage;
- conversely, when the start voltage is less than the comparison voltage in the second comparing, then:
  - operating the power supply circuit in the second phase wherein the switched-mode power supply is controlled using pulse width modulation to cause the increase in the output voltage.

8. The method of claim 7, wherein operating in the second phase comprises:
- increasing the start voltage in accordance with a ramp; and
- comparing the ramping start voltage to the comparison voltage set at the second level.

9. The method of claim 8, further comprising, when the ramping start voltage reaches the comparison voltage in the second phase, then operating the power supply circuit in the third phase.

* * * * *